United States Patent [19]
Schneider

[11] Patent Number: 6,109,102
[45] Date of Patent: Aug. 29, 2000

[54] SYSTEM FOR SUPERIMPOSING DATA

[75] Inventor: Thomas Schneider, Markgroeningen, Germany

[73] Assignee: Robert Bosch GmbH, Stuttgart, Germany

[21] Appl. No.: 08/865,314

[22] Filed: May 29, 1997

[30] Foreign Application Priority Data

May 31, 1996 [DE] Germany .......................... 196 21 902

[51] Int. Cl.[7] .............................. G01P 15/00; G01P 3/00
[52] U.S. Cl. ................................. 73/488; 73/495; 73/509
[58] Field of Search ............................ 73/488, 495, 509; 318/600, 601; 370/527; 303/122, 121

[56] References Cited

U.S. PATENT DOCUMENTS

| | | |
|---|---|---|
| 3,812,710 | 5/1974 | Bauman et al. . |
| 3,827,026 | 7/1974 | Viswanathan ............................ 370/212 |
| 4,076,330 | 2/1978 | Leiber ....................................... 303/92 |
| 4,353,020 | 10/1982 | Veale ...................................... 318/601 |
| 4,593,284 | 6/1986 | Clifford et al. . |
| 4,719,616 | 1/1988 | Akano ..................................... 370/527 |
| 4,836,616 | 6/1989 | Roper et al. ............................... 303/92 |
| 5,184,121 | 2/1993 | Kogure et al ...................... 340/870.11 |
| 5,212,551 | 5/1993 | Conanan ................................. 348/484 |
| 5,469,156 | 11/1995 | Kogure .............................. 340/870.38 |
| 5,469,746 | 11/1995 | Fukunaga et al. .................... 73/861.12 |

FOREIGN PATENT DOCUMENTS

| | | |
|---|---|---|
| 0 244 807 | 11/1987 | European Pat. Off. . |
| 26 06 012 | 8/1977 | Germany . |
| 32 01 811 | 9/1983 | Germany . |
| 35 10 651 | 9/1986 | Germany . |
| 43 22 440 | 2/1995 | Germany . |
| 2 111 352 | 6/1983 | United Kingdom . |
| 2164526 | 3/1986 | United Kingdom . |
| 2 277 778 | 11/1994 | United Kingdom . |
| WO 97/08674 | 3/1997 | WIPO . |

OTHER PUBLICATIONS

R. Schlefer, "*Integrierte Hall–Effekt–Sensoren zur Positions–und Drehzahlerkennung*," 1995, Elektronik Industrie, No. 7, pp. 29–31*.

von e. Zabler et al., "*Neue alternative Lösungen für Drehzehisensoren im Kraftfahrzueg auf magnetoresistiver Basis*,"Mar. 21, 1984, Sensoren–Technologie und Anwendung, VDI Berichte, no. 509, pp. 263–268*.

*Primary Examiner*—Richard A. Moller
*Attorney, Agent, or Firm*—Kenyon & Kenyon

[57] ABSTRACT

A system for superimposing data in which data are represented by a constituted analog signal. The analog signal periodically has two presettable levels (high, low), with the data being represented with the time duration of the analog signal. The presettable levels (high, low) of the analog signal can be realized in this context by two different current or voltage values. Other data are present in the form of a constituted digital signal which represents the data in the form of a digital data word. In order to constitute a superimposed signal, a digital signal is superimposed on the analog signal.

10 Claims, 12 Drawing Sheets

SYSTEM FOR SUPERIMPOSING DATA

FIELD OF THE INVENTION

The present invention relates to a system for superimposing data.

BACKGROUND INFORMATION

More and more sensors are being used to control and regulate operations in motor vehicles. This means that more and more sensor signals must be transmitted (independently of one another) to the control and regulation units. Individual signals must, in this context, meet different requirements. If the individual signals are combined into a "summed signal," the individual requirements must still be met.

It is known to measure the rotational speeds of the vehicle wheels to regulate or control braking force, drive power, and/or driving dynamics. A number of methods (for example Hall-effect sensors or magnetoresistive sensors) are indicated for this purpose in the art. It is also known to determine the wear on the brake lining of a motor vehicle brake by, for example, embedding contact pins at a certain depth in the brake linings, with the pins connecting with a contact when the brake lining has worn to that depth.

Publication "Integrierte Hall-Effekt-Sensoren zur Positions- und Drehzahlerkennung" (Integrated Hall-effect sensors for detecting position and rotational speed), elektronik industrie 7, 1995, pp. 29–31, describes how active sensors (Hall-Effect sensors) used in motor vehicles for anti-lock braking, automatic slip control, engine and transmission control and regulating systems. In a two-wire configuration, such sensors supply two current levels which are converted into two voltage levels by a measuring resistor in a corresponding control unit.

The use of magnetoresistive sensors for rotational speed sensing is also described in the publication "Neue, alternative "Lösungen für Drehzahlsensoren im Kraftfahrzeug auf magnetoresistiver Basis" (New alternative solutions for magnetoresistively based rotational speed sensors in motor vehicles), VDI-Berichte No. 509, 1984.

German Patent No. 26 06 012 (corresponding to U.S. Pat. No. 4,076,330) describes a specific shared arrangement for sensing the wear on a brake linking and for sensing wheel rotational speed. The sensed brake lining wear signals and the wheel rotational speed signals, which are sensed using an inductively operating sensor, are sent through a shared signal line to an analysis unit. This can be achieved since the wheel rotational speed sensor is entirely or partly short-circuited in response to the sensing of brake lining wear.

Other systems described, for example, in German Patent No. 43 22 440 require at least two signal lines between a wheel unit and the analysis unit in order to detect rotational speed and brake lining wear at a wheel and a wheel brake.

With respect to the rotational speed sensing, it is known that an air gap between a rotating ring gear and actual sensor element has a considerable influence on the quality of the rotational speed signal, as described in German Patent No. 32 01 811.

Information about the rotational direction of the wheels is also required, for example, for "hill-holder" systems. Such information is required to indicate whether the vehicle is moving backward. This is described in German Patent No. 35 10 651.

The aforementioned data (e.g., brake lining wear, air gap and rotational direction), as well as other data, are generally sensed close to the wheel and analyzed in a control unit, which is remotely positioned from the wheel. The data must be transmitted to the control unit for this purpose.

In the case of a motor (internal combustion and/or electric motor), it is known to sense the motor rotational speed with inductive, magnetoresistive, or Hall-effect sensors.

In German Patent Application No. 1 96 09 062.8, it is indicated that the data of an analog rotational speed signal that periodically includes two presettable current or voltage levels. The presettable current and voltage levels have digital data regarding the brake lining wear, air gap, and/or rotational direction superimposed on them so that the current or voltage level of the analog rotational speed signal is modified in coded manner.

Increasing the current level in order to transmit the additional digital data is advantageous since only one two-wire connection between the sensor unit and the control unit is necessary. Increasing the current level results, however, not only in an increase in dissipated power but also in an increased voltage drop at the measuring resistor in the control unit. Changing the voltage level does not increase the dissipated power, but does require a three-wire connection (voltage supply, ground and signal line) between the sensor unit and the control unit.

It is the object of the present invention to superimpose digital data onto an analog signal in the simplest and most reliable manner possible.

SUMMARY OF THE INVENTION

The present invention achieves this object with a system for superimposing data. The data are represented by a constituted analog signal, the signal periodically having two presettable levels (high, low), and the data being represented by the period of the analog signal. The presettable levels (high, low) of the analog signal can be realized by two different current or voltage values. Other data contain a digital signal which represents the data in the form of a digital data word. The present invention provides that in order to constitute a superimposed signal, the digital signal is superimposed on the analog signal.

Superimposition of the data according to the present invention avoids the above-mentioned increase in dissipated power and an increased voltage drop at a measuring resistor. In addition, the amount of digital data to be superimposed is very high, so that the analog signal experiences neither a phase shift nor a frequency shift.

The superimposition according to the present invention is advantageously provided so that the digital signal is superimposed on the analog signal only within a fixed signal state (high phase or low phase). Thus, the digital signal is superimposed on the analog signal only when the analog signal has one of the presettable levels (high or low).

The data word consists of a sequence of bits, each bit having two levels (high, low) of presettable temporal length. These levels represent the digital data and can also be realized by two different current or voltage levels. The temporal length of the bits is defined as a first clock cycle by a first clock-pulse generator.

The bits constituting the data word have the same levels or signal states (high, low) as the analog signal. During the analysis (e.g., upon separation of the superimposed data), the bits can be differentiated from the analog signal since the bits are output only after a state change (high-low or low-high) in the analog signal, and are substantially shorter than the minimum possible time during which the analog signal occupies a state.

In another embodiment of the present invention, a permanently presettable number of bits with a permanently presettable level can be preset at the beginning and/or at the end of the digital word to constitute a total data word. When the data are separated in the control unit, these start or stop bits then ensure reliable recognition as to when the actual digital data in the form of the data word begin.

The present invention provides for the sensor apparatus used to sense all the data to be combined as a sensor unit. The superimposed signal constituted in the sensor unit is then conveyed from the sensor unit to an analysis unit. A first clock-pulse generator is then provided in the sensor unit to assemble the digital data word, while a second clock-pulse generator must be provided in the analysis unit to analyze the superimposed signal. Due to cost and/or complexity, at least one of the two clock-pulse generators can be designed with a certain timekeeping inaccuracy. In a further embodiment of the present invention, a permanently presettable number of bits with a permanently presettable level (synchronizing pulse) can be provided at the beginning and/or the end of the digital data word (or the total data word). This synchronizes the second and generally more accurate clock-pulse generator in the analysis unit with the first and generally more inaccurate clock-pulse generator in the sensor unit. Error-free analysis of the superimposed signal in the analysis unit is substantially assured, without making stringent demands on the accuracy of the first clock-pulse generator.

With respect to the above-mentioned synchronization, one or more defined bits are appended before or after the data word or the total data word (data word with start and/or stop bit). This takes place within the fixed signal state (high or low phase) of the analog signal. In addition, the digital data word or the total data word can be superimposed on only one of the two levels (high or low) of the analog signal, while for synchronization, the permanently presettable number of bits with a permanently presettable level (synchronizing pulse) is superimposed on the other of the two levels (high or low) of the analog signal. This embodiment is advantageous in that the data word to be transmitted (and/or the individual bits) can be longer. In addition, the synchronizing pulse (permanently presettable number of bits with a permanently presettable level) can be longer (up to one data word), which provides more accurate synchronization.

As mentioned above, the superimposed signal is sent to an analysis unit, where the bits are sampled in a second clock cycle preset by a second clock-pulse generator. The effect of synchronization in this context is that the second clock cycle is set as a function of the permanently presettable number of bits with a permanently presettable level (synchronizing pulse). In order to sample the superimposed signal and the data word contained therein, generally more accurate clock-pulse generator in the analysis unit is thus adapted to the generally more inaccurate clock-pulse generator in the sensor unit.

The data word can be constituted in such a way that the digital data (BBV, LS, DR) are read into a shift register and, once read in, the digital data are read out serially and synchronously with the analog signal (DF).

The system according to the present invention can be used in a motor vehicle. The analog signal can represent the rotational speed of a vehicle wheel, the rotational speed of a vehicle motor configured as a gasoline, diesel, and/or electric motor, and/or the rotational speed of a shaft effectively coupled to the vehicle transmission. The data represented by the digital data word can be:

Data (BBV) relating to brake lining wear on at least one vehicle wheel brake;

Data (DR) relating to the direction of rotation; and/or

Data (LS) relating to the status of the means by which the analog signal (DF) is sensed (air gap).

BRIEF DESCRIPTION OF THE DRAWINGS

FIG. 4b shows a magnetically passive incremental rotor and additional components illustrate din FIG. 4a.

FIG. 4c shows a first profile of bridge voltage signals generated by an arrangement illustrated in FIG. 4a.

FIG. 4d shows a second profile of bridge voltage signals generated by an arrangement illustrated in FIG. 4a.

DETAILED DESCRIPTION

Figure 1:
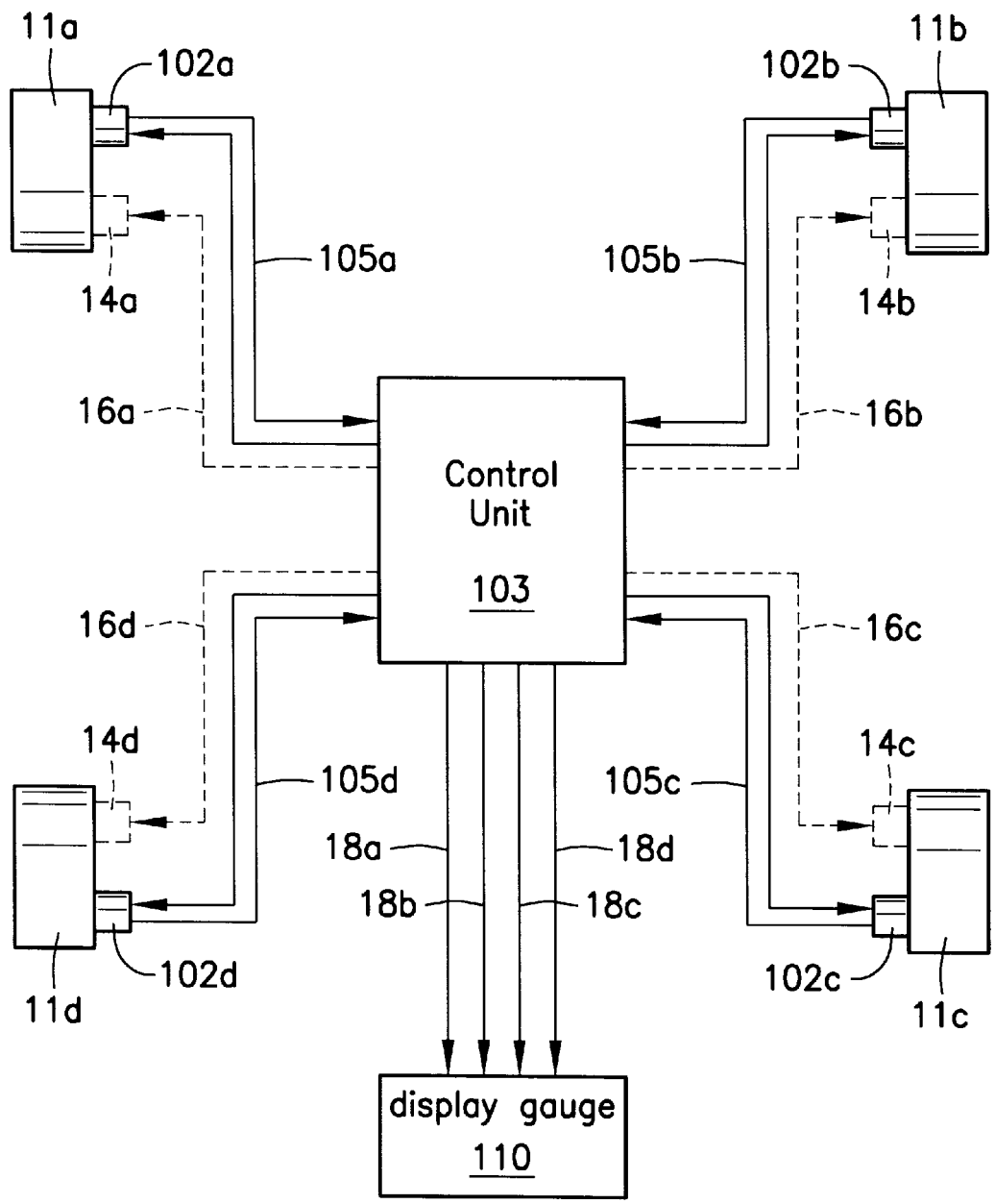
FIG. 1 schematically shows a prior-art block diagram.

FIG. 1 shows a schematic block diagram of a system for determining brake lining wear and wheel rotational speeds in a motor vehicle. Reference symbols 11a–11d therein designate wheel units of the motor vehicle. The wheel units include wheels, whose rotational speeds (wheel rotational speeds) are to be measured, and the braking system (friction brake) associated with each wheel unit. Reference symbols 102a–102d designate the rotational speed sensors and brake lining wear sensors that are associated with each wheel and will be described in more detail with references to FIGS. 2 and 3. Regarding the configuration of said sensors over and above the present invention, reference is expressly made to the related art cited initially.

The output signals of the rotational speed sensors and brake lining wear sensors 102a–102d are connected to control unit 103 via transmission lines 105a–105d. In control unit 103, the data transmitted via transmission lines 105a–105d are then analyzed on a centralized basis for all wheel units. A condition of the brake linings is sent (as an analytical result of control unit 103) via lines 18a–18d to display gauge 110. For this purpose, a corresponding notification can be provided to the driver when one or more brake linings have worn to a predetermined level.

The braking systems of the individual wheel units 11a–11d (activated from control unit 103) have reference symbols 14a–14d.

Figure 2:
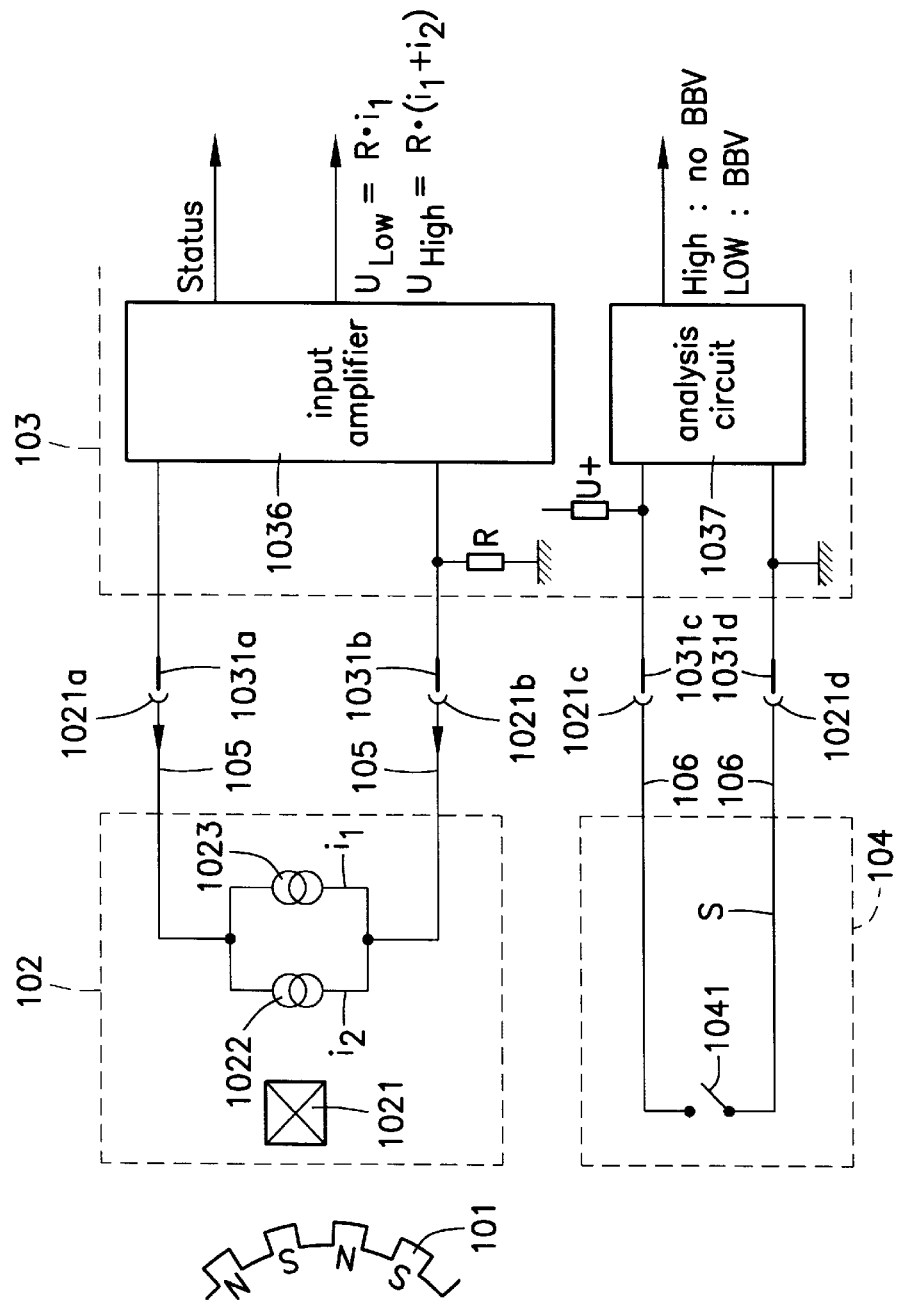
FIG. 2 shows a simple combination of an active rotational speed sensor with a brake lining wear sensing system.

FIGS. 2 and 3 show different examples of a system controlling, for example, a single wheel unit.

FIG. 2 shows a combination of an active rotational speed sensor with a brake lining wear sensing system. As described above, a known Hall-effect rotational speed sensor or a known magnetoresistive rotational speed sensor can be provided as the "active" rotational speed sensor 102. Thus, FIG. 2 shows that a sensor element 1021 samples a magnetically passive incremental rotor 101. Sensor element 1021 sets two current levels $i_1$ and $i_2$ as a function of the number of increments of rotor 101 sampled, which is shown in FIG. 2 as the switching in and out of two current sources 1022 and 1023.

Rotational speed sensor 102 is connected to analysis unit 103 via lines 105 and via plug connections 1021a and 1021b and 1031a and 1031b. Input amplifier 1036 detects the voltage values corresponding to the current levels of rotational speed sensor 102 using input resistor R:

$$U_{low} = R * i_1$$

$$U_{high} = R * (i_1 + i_2)$$

Figure 4A:
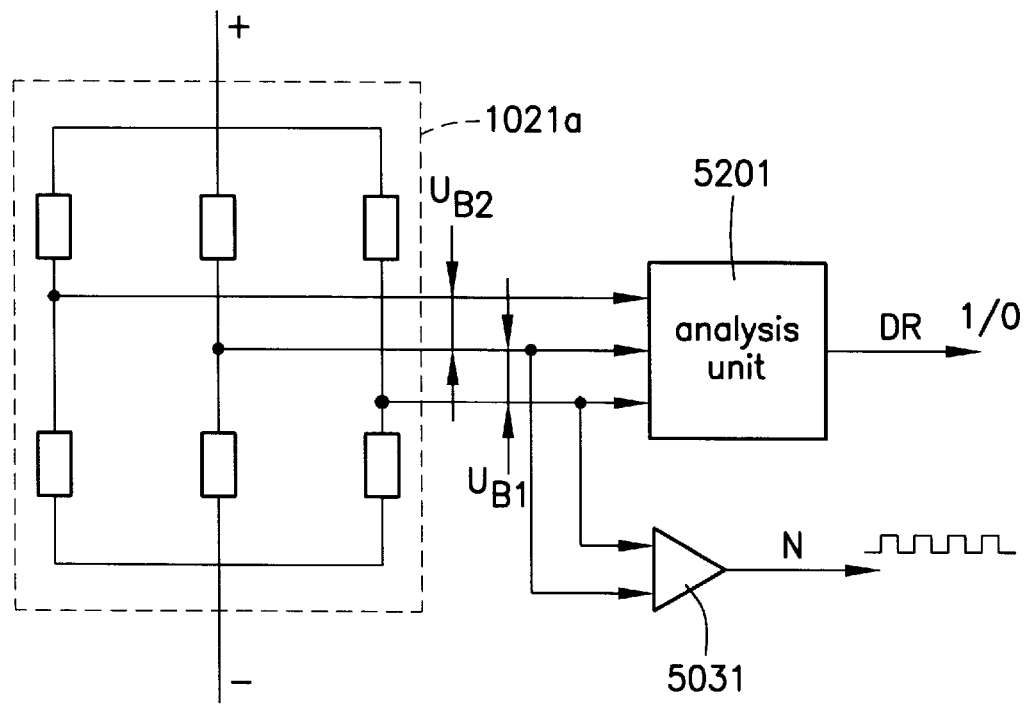
FIG. 4a shows another diagram for detecting an excessive spacing.
Figure 4B:
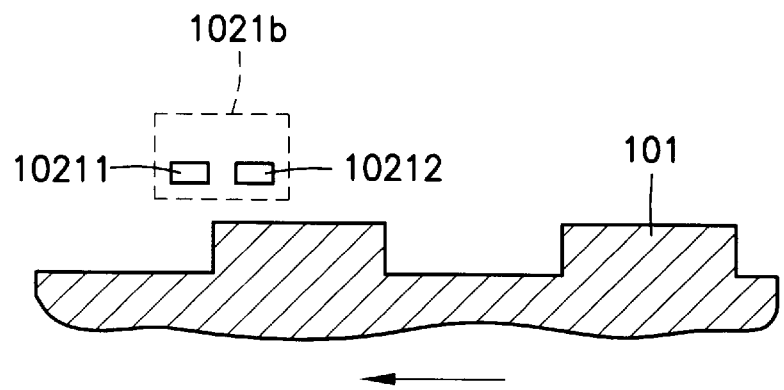

A typical profile for a substantially constant wheel rotational speed is shown at the bottom of FIG. 4b. An analysis of the frequency of this signal provides the desired wheel rotational speed.

A conventional sensing system 104 for brake lining wear on a wheel brake is shown in FIG. 2. As indicated above, the brake lining wear sensor determines the erosion of the brake lining of a vehicle brake since, for example, contact pins are embedded at a certain depth in the brake lining and trigger a contact when the brake lining has been worn to that predetermined depth. The contact is designated in FIG. 2 as switch 1041. Under normal conditions (no brake lining wear requiring indication), switch 1041 is open and voltage U+ is not grounded. When the brake lining reaches a certain degree of wear, switch 1041 is closed. This is detected in analysis circuit 1037 because of the grounding via connection 106 and plug connection 102 and 1031.

As shown in FIG. 2, respective separate signal lines 105 and 106 transmit the wheel rotational speed data and the data regarding the state of the brake linings.

Figure 3A:
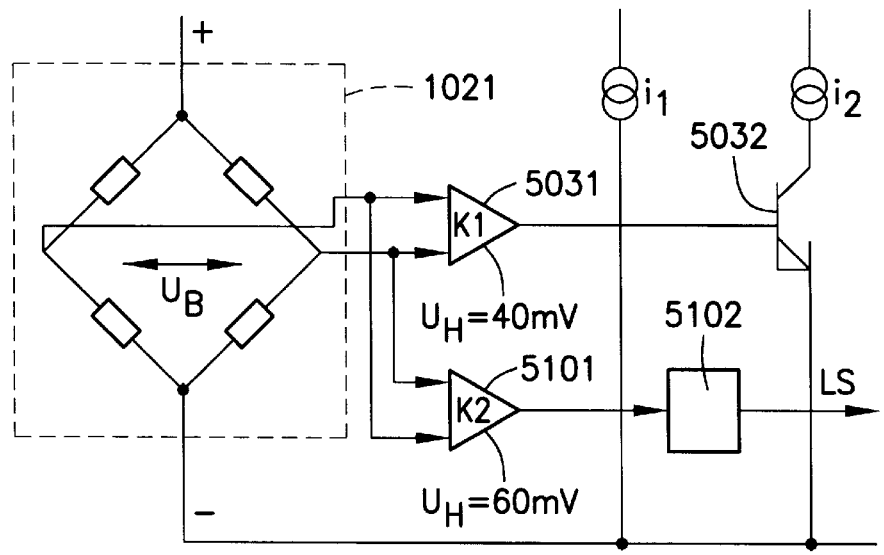
FIG. 3a shows a diagram for detecting an excessive spacing.
Figure 3B:
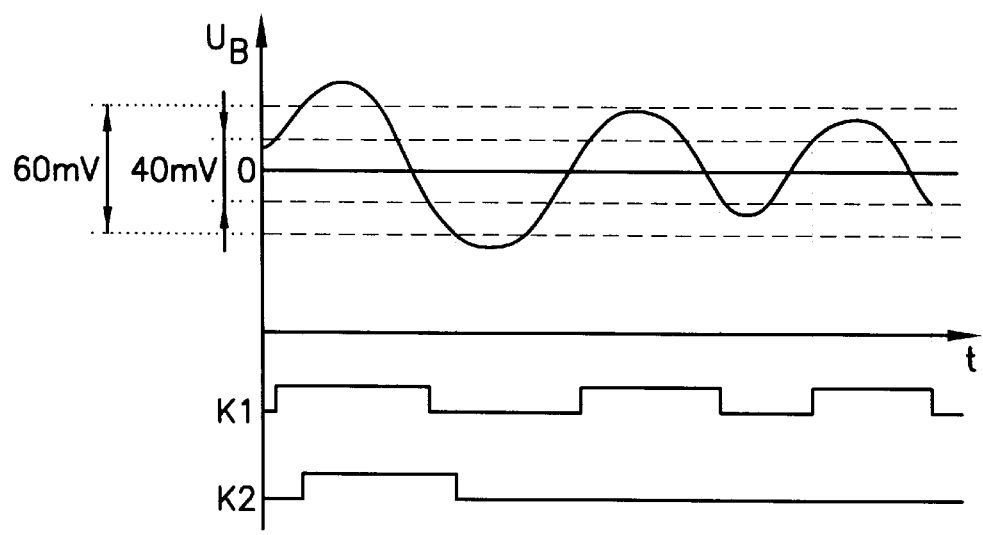
FIG. 3b shows a typical signal profile of a bridge voltage over time.

FIG. 3a shows a diagram for sensing an excessive spacing using a Hall-effect or a magnetoresistive sensor from a ring gear 101 of the vehicle wheel whose rotational speed is to be sensed. Sensor element 1021 is also shown in FIG. 2. Sensor element 1021 is generally configured as a Wheatstone bridge having an annular arrangement of resistors. Passage of the individual segments of ring gear 101 (shown in FIG. 2) generates the bridge voltage $U_B$ in the Wheatstone bridge that is conveyed to comparators 5031 and 5101. Comparator 5031 analyzes the wheel rotational speed. A further analysis of the bridge voltage is performed by in comparator 5101, where the bridge voltage is compared with a relatively high threshold value $U_H$. FIG. 3b is discussed below as background for the threshold value comparisons.

FIG. 3b shows a typical signal profile of the bridge voltage over time. The bridge voltage periodically increases and decreases depending on the speed at which the individual segments of the ring gear pass by. If the spacing (or the air gap) between the ring gear and Wheatstone bridge 1021 remains constant, the bridge voltage has a constant amplitude. If the spacing becomes too great, the amplitude of the bridge voltage decreases, as shown in FIG. 3b.

FIG. 3a shows a first threshold value comparison in comparator 5031, which compares the bridge voltage signal to a relatively low threshold value (e.g., 40 mV). At its output, comparator 5031 then supplies the activation signal K1 (shown in FIG. 3b) to current sources $i_1$ and $i_2$ (also see FIG. 2). Signal K1 represents the wheel rotational speed, even if the air gap is increasing. Comparator 5101 verifies the amplitude of the bridge voltage signal such that a relatively high threshold (e.g., 60 mV) is set therein. If the spacing between the ring gear and the Wheatstone bridge (e.g., the air gap) is sufficiently small, the amplitude of the bridge voltage signal is then above the threshold of comparator 5101. As shown in FIG. 3b, under normal circumstances the output signal K2 of comparator 5101 has a time delay signal K1. If comparator signal K2 is absent, the amplitude of the bridge voltage signal decreases, indicating an excessive air gap.

The absence of signal K2 is detected in unit 5102, which generates a digital signal LS.

To summarize the process of detecting the air gap, the rotational speed signals of a wheel are sensed using an active sensor (e.g., a Hall-effect sensor or a magnetoresistive sensor). The sensors contain a Wheatstone bridge that is detuned by a varying magnetic field. The signal for the rotational speed is obtained from this detuning. The magnitude of the detuning is maintained at a fixed ratio to the magnitude of the magnetic field difference between the two bridge halves. The magnetic field difference depends, among other factors, on the spacing between the sensor and the magnet wheel. If the magnitude of the bridge detuning is analyzed, parameters of the air gap between the sensor and the magnet wheel can be established. This analysis can be performed with a comparator 5101 that has a greater hysteresis ($U_H$=60 mV) than the normal useful signal comparator ($U_H$=40 mV). If the air gap is small, both comparators activate, if the air gap is too large, only useful signal comparator 5031 activates. Thus, an early-warning system for an excessive air gap becomes visible, without losing the wheel rotational speed information. This information can be used, for example, as an end-of-line check during motor vehicle production, in the shop, or while driving.

FIGS. 4a and 4b show the analysis performed to detect the rotational direction of a wheel. A Hall-effect or magnetoresistive sensor 1021a is provided for this purpose in FIG. 4a, modified as compared to sensing element 104 shown in FIG. 3a. The Wheatstone bridge (shown in FIG. 3a) is supplemented with two additional resistors. Instead of the modified Wheatstone bridge, the modified Hall-effect or magnetoresistive sensor can also consist of at least two separate sensitive elements 10211 and 10212 or two complete Wheatstone bridges, as shown in FIG. 4b. The individual elements of incremental rotor 101, e.g., the ring gear, magnet wheel, or sensor wheel (shown in FIG. 2) generate corresponding changes in bridge voltage signals $U_{B1}$ and $U_{B2}$. The bridge voltage signals are sent to analysis unit 5201. Simultaneously, at least one of the bridge voltage signals is sent to the previously described comparator 5031 for analysis of a useful signal. The function of rotational direction detection system 5201 is described below with reference to FIGS. 4c and 4d.

Figure 4C:
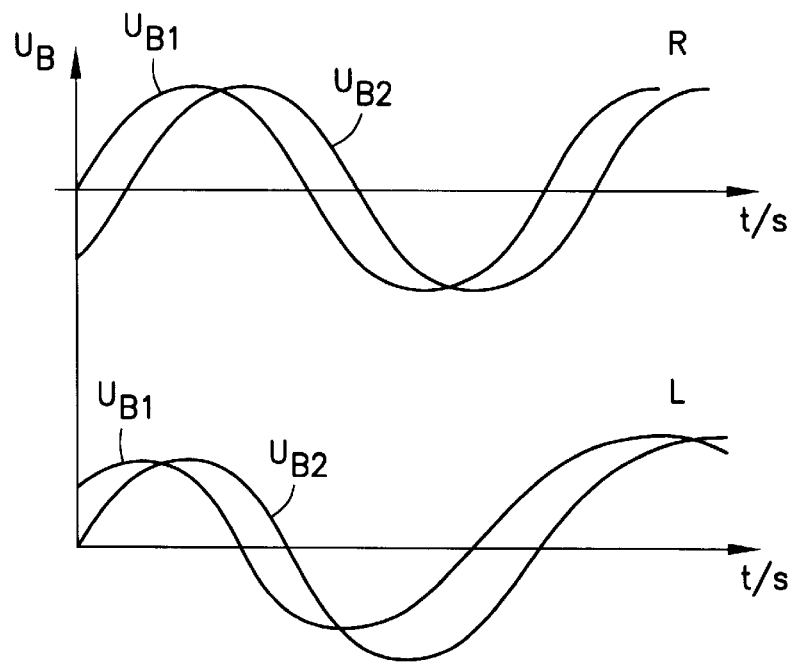
Figure 4D:
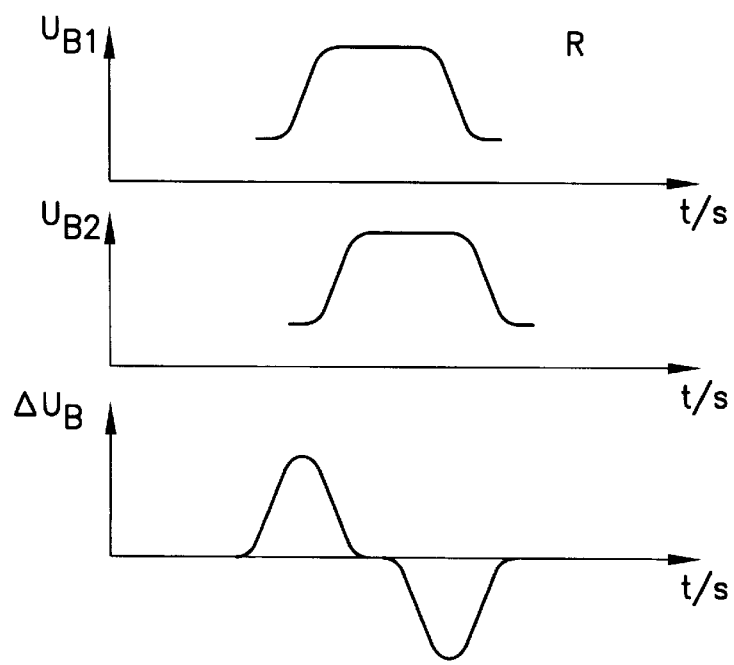

FIGS. 4c and 4d show profiles of the bridge voltage signals $U_{B1}$ and $U_{B2}$ for considering a change over time t, or a change over distance s (or over the rotational angle of the sensor wheel). Depending on the rotational direction of the wheel, either the right part of modified Wheatstone bridge or the left part, is detuned first. When the wheel is rotating to the right, bridge voltage $U_{B1}$ leads bridge voltage $U_{B2}$, while the bridge voltage $U_{B2}$ leads bridge voltage $U_{B1}$ for rotation of the wheel to the left. Rotation direction analyzer (analysis unit) 5201 analyzes the phase shift of the two bridge voltage profiles; signal DR is then generated if the wheel is rotating backward. As an alternative (as shown in FIG. 4d), the difference $\Delta U_B$ between the two bridge voltage values $U_{B1}$ and $U_{B2}$ can be determined. The profile of said difference $\Delta U_B$ (e.g., the locations of the maxima and minima—"top" or "bottom" peaks), then yield the DR datum regarding rotational direction (forward/backward).

Figure 5:
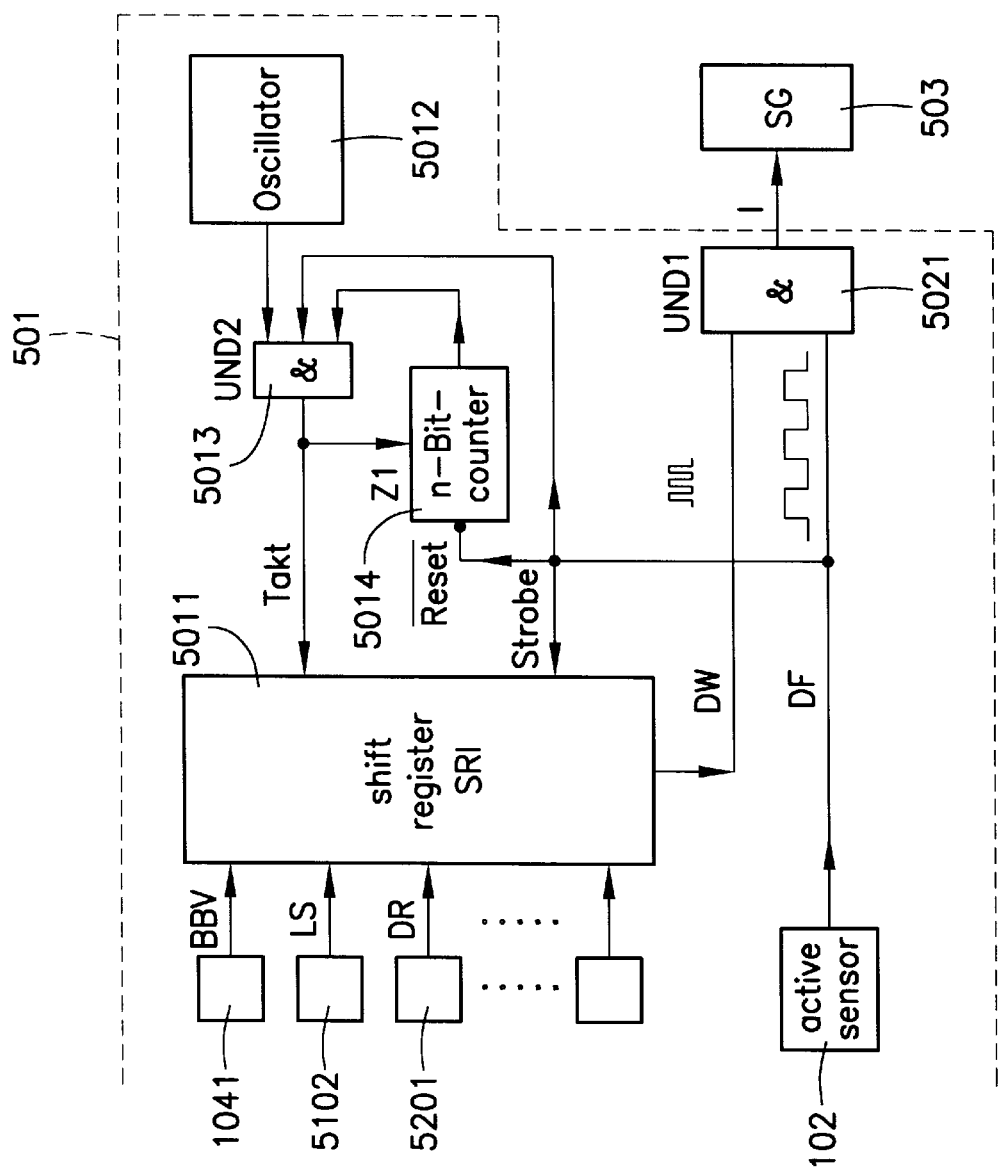
FIG. 5 shows a first embodiment of the system according to the present invention.

FIG. 5 shows a first embodiment of the system according to the present invention. Reference symbol 501 designates a sensor unit and reference symbol 503 designates an analysis unit (as described with respect to FIG. 7).

The devices for detecting rotational speed signal DF are included in sensor unit 501. The device can be configured as an active sensor 102 (see FIG. 2). Rotational speed signal DF (shown as a top signal in FIG. 6) consists of a temporal sequence of high and low states, the period and frequency of the analog signal indicating the rotational speed and rotational angle velocity, respectively. Analog signal DF is sent to superimposer 5021.

The devices for sensing brake lining wear, the air gap, and the rotational direction are also included in sensor unit 501. In FIG. 5 shows the respective last component of each device is labeled with the reference symbol

1041 (shown in FIG. 2 generating a digital signal BBV, which indicates excessive brake lining wear—"yes" or "no");

5102 (shown in FIG. 3a generating a digital signal LS, which indicates excessive air gap—"yes" or "no"); and

5201 (shown in FIG. 4a generating digital signal DR, which indicates a rotational direction—"forward" or "backward").

These exemplary digital signals are read into the memory cells of shift register 5011 so that the respective contents of the memory cell correspond to the current state of the brake lining wear, air gap, and rotational direction. With the change of the analog DF signal from low to high, the memory cell contents of shift register 5011 are frozen by the PIN strobe, i.e. no further updates can occur. At the same time, when a change occurs the contents of the memory cells of shift register 5011 are read out in serial fashion by the PIN strobe (serial output of shift register 5011), which takes place under the control of the 10 clock cycle defined by oscillator 5012. This produces data word DW at the serial output of shift register 5011, which consists of a sequence of high and low levels, referred to as "bits." If clock cycle fluctuations are ignored, the bits have identical temporal lengths.

Shift register 5011 is read out whenever a change of state (from low state to high state) occurs in rotational signal DF. This is shown in FIG. 5 by connecting a DF line to the input of shift register 5011. Simultaneously with the change of state in the DF signal from low state to high state, counter 5014 is reset, counter 5014 being connected at its output to the input of logical AND gate 5013. The other two inputs of logical AND gate 5013 are connected by the clock cycle of oscillator 5012 and to the change-of-state signal (i.e., the DF signal).

When a change of state in the DF signal from low state to high state occurs, the memory contents of shift register 5011 are read out serially for each memory cell present. In the example shown in FIG. 5, counter 5014 counts to n=3. Counter 5014 thus limits the clock cycle count to the data word width, and is reset by the low level of the DF signal.

Figure 6:
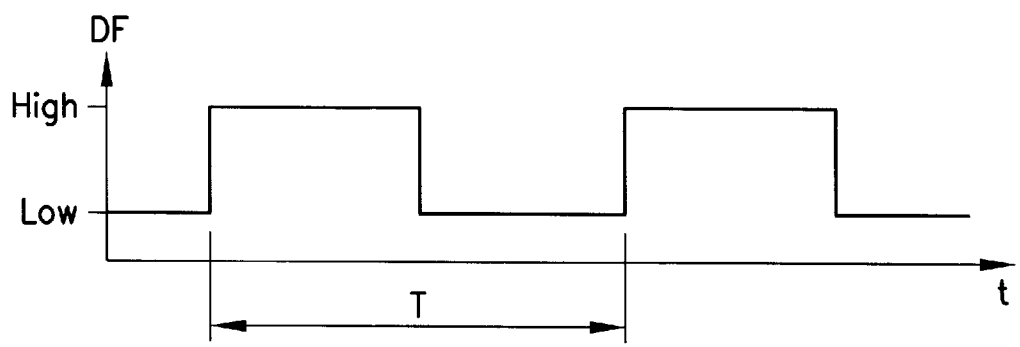
FIG. 6 shows a graph a rotational speed signal generated by an active sensor of the system illustrated in FIG. 5.
Figure 6:
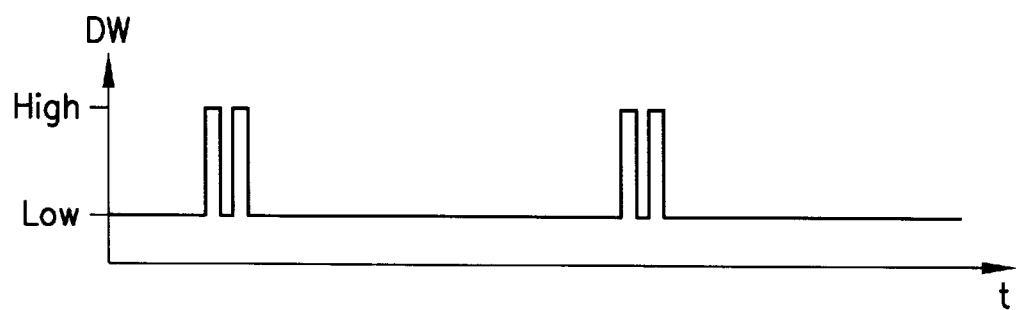
Figure 6:
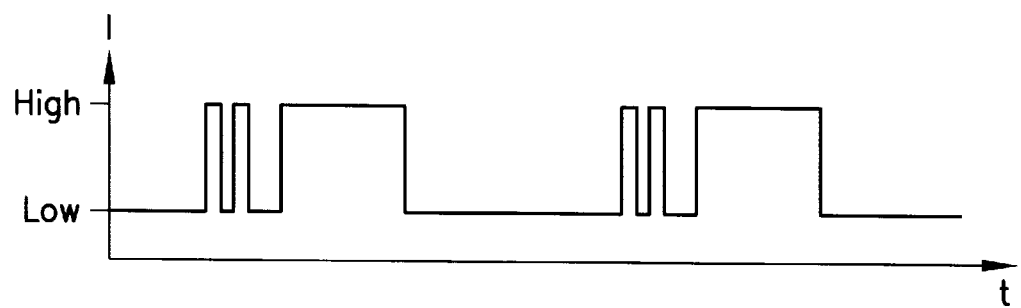

Data word DW thus formed is shown as a center signal in FIG. 6. Data word DW has three bits, the first bit being in the "high" state, the second in the "low" state, and the third in the "high" state. This may indicate (depending on how the correlation is defined) that brake lining wear requiring display (BBV=high), an air gap not requiring display (LS=low), and backward travel (DR=high) are present.

Logical AND gate 5021 combines rotational speed signal DF with data word DW to form superimposed signal I. The bottom signal shown in FIG. 6 corresponds to data word DW, which is always located in superimposed signal I at the beginning of a high state. This is achieved by initiating data word DW concurrently with the change in state of the rotational speed signal DF from low state to high state. Rather than the high phase, the data word can also be superimposed on the low phase of the rotational speed signal. The data word DW must, however, be completed before the next change in state of the rotational speed signal DF signal occurs. In the case of a conventionally designed wheel rotational speed sensor, the maximum possible rotational speed frequency is approximately 3 kHz, resulting in a maximum data word length of approximately 100 μsec for a possible sampling ratio between 30% and 70%. Superimposed signal I can be transmitted as a voltage signal through a three-wire line, or as a current signal through a two-wire line, to analysis unit 503.

Figure 7:
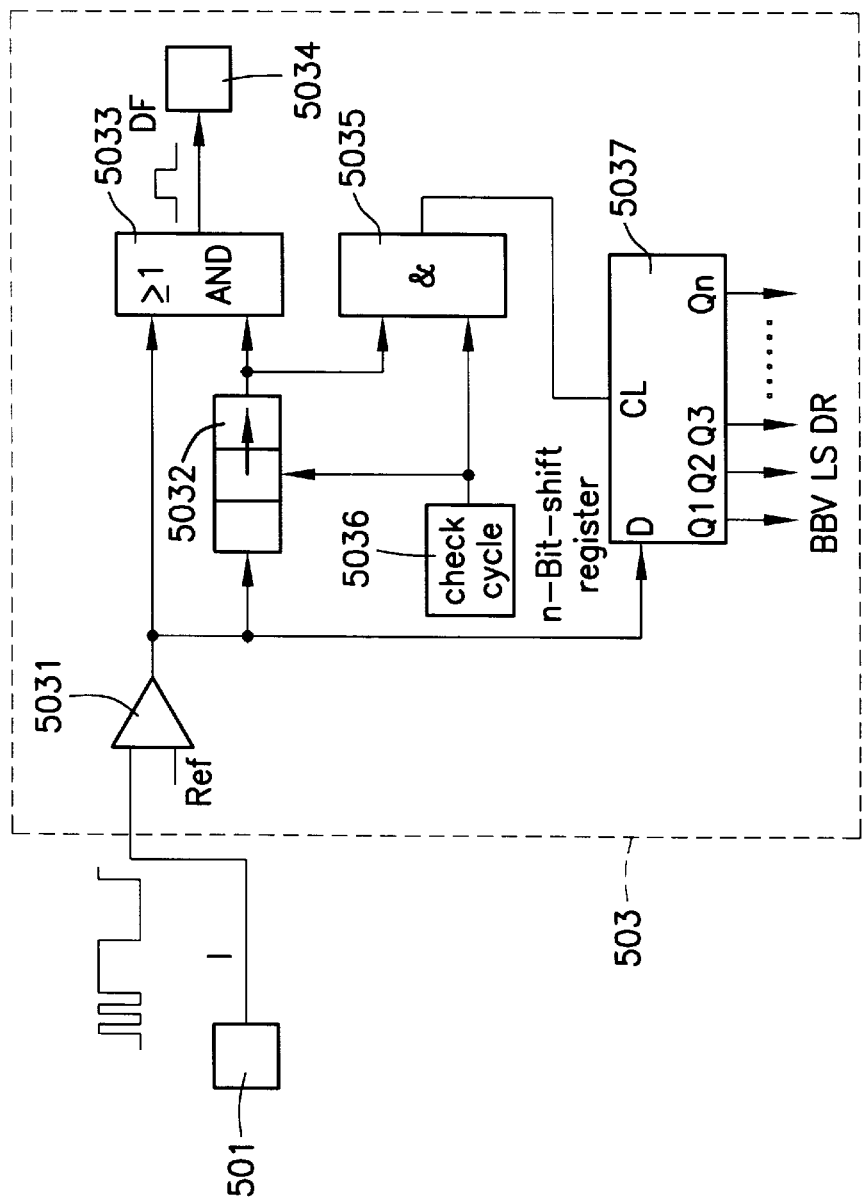
FIG. 7 shows a detailed diagram of an analysis unit illustrated in FIG. 5.

FIG. 7 shows an example of analysis unit 503, in which the change in state of superimposed signal I from low to high is detected using a comparator 5031 with a corresponding threshold value Ref. When the first change in state of superimposed signal I from low to high is detected, counter 5032 and shift register 5037 in the analysis unit 503 are started. Using a combining procedure in logical AND gate 5033, the output of counter 5032 holds the rotational speed signal DF at high level for at least the time duration of the data word (for example 100 μsec), thus preventing the data word from appearing at the output of logical AND gate 5033. Thus, the output of counter 5032 provides only the rotational speed signal DF with a frequency which can be analyzed in unit 5034 to determine the rotational speed. At the same time, clock-pulse generator 5036 starts the clock cycle of shift register 5037, thereby reading in data word DW. Data word DW can then be tapped at outputs Q1 to Qn and processed further, e.g., to activate a corresponding display.

Figure 8:
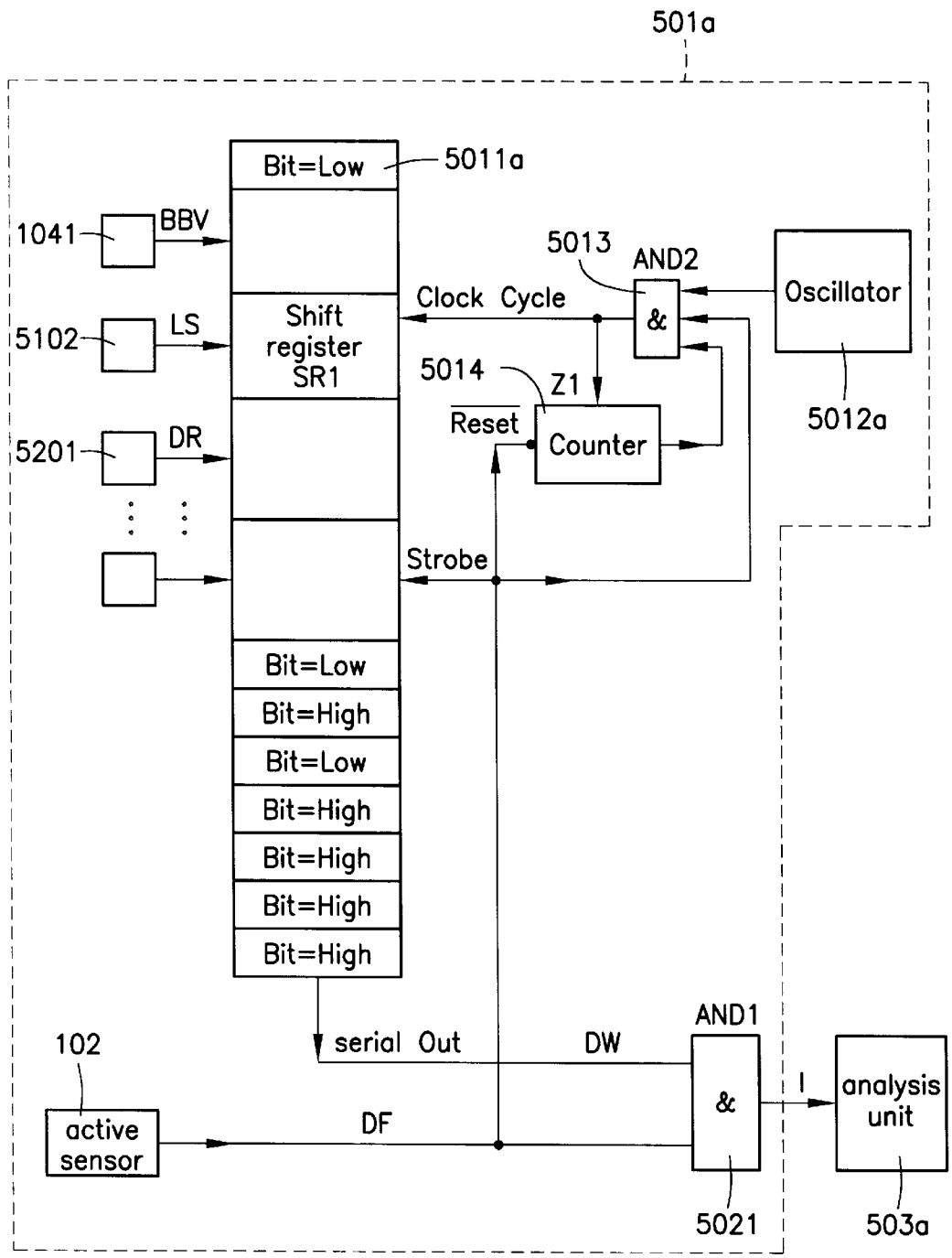
FIG. 8 shows a second embodiment of the system according to the present invention.

FIG. 8 shows as second embodiment of the system according to the present invention. The essential difference between the first embodiment shown in FIG. 5 and the second embodiment is that in the first embodiment, it was assumed that the sensor unit clock-pulse generator (oscillator 5012) and clock-pulse generator 5036 of the analysis unit run synchronously. In the second embodiment according to the present invention, in addition to the rotational speed datum and the data word, a datum is transmitted from sensor unit 501a to analysis unit 503a to synchronize the clock-pulse generators. Furthermore, in the second embodiment, the actual data word is supplemented with a start bit and stop bit sequence in order to make analysis even more reliable.

The maximum rotational speed frequency is approximately 2 kHz (48 teeth on ring gear 101, at a maximum vehicle speed of 300 km/h). Assuming a frequency reserve of 1 kHz, the result (with a possible signal sampling ratio of between 30% and 70%) is a maximum total data word width of $$T_{max}=0.3*\frac{1}{3} \text{ kHz}=100 \text{ μsec}.$$

If 8 data bits, 2 start bits, 1 stop bit and "4+1" time synchronizing bits are to be transmitted, the result is 16 bits.

At an oscillator accuracy of +/−20%, this requires a nominal clock cycle time of 5 μsec (200 kHz). The maximum is 6 μsec (166.6 kHz), and minimum 4 μsec (250.0 kHz). In the example shown in FIG. 8, 4 data bits, 2 start bits, 1 stop bit and "4+1" time synchronizing bits (12 bits) are transmitted.

Figure 9:
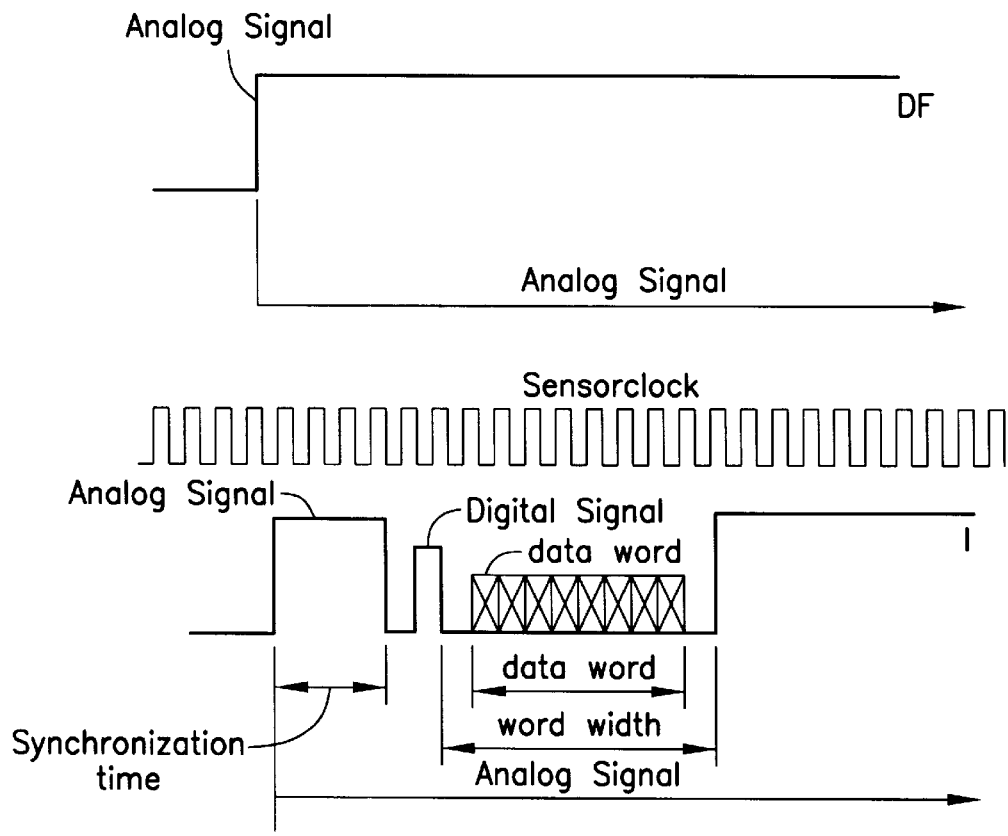
FIG. 9 shows a graph the rotational speed signal generated by the active sensor of the system illustrated in FIG. 8.

Superimposed signal I (having 8 data bits, 2 start bits, 1 stop bit and "4+1" time synchronizing bits) is shown in the bottom part of FIG. 9, the amplitudes being drawn at different heights for better differentiation. The top portion of FIG. 9 shows the rotational speed signal DF (the "DF signal"). With the change in state of the DF signal from low to high, the actual data word is preceded first by a synchronization bit sequence (4 high bits, 1 low bit, 1 high bit) and 1 low bit as the start bit. The actual data word (8 bits) is terminated with a low bit as the stop bit, well before the next change in state of the DF signal from high to low occurs. The width (e.g., the temporal length) of the bit is given by the clock cycle of clock-pulse generator 5012a (labeled as "Sensor clock" in FIG. 9).

Figure 10:
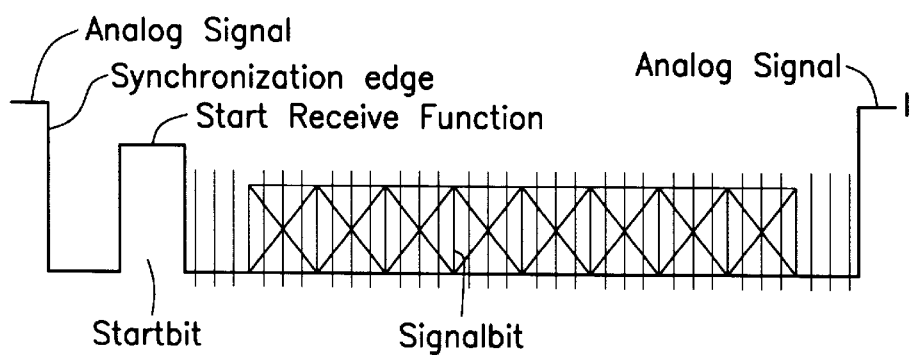
FIG. 10 shows a graph of a superimposed signal, according to the present invention.
Figure 11:
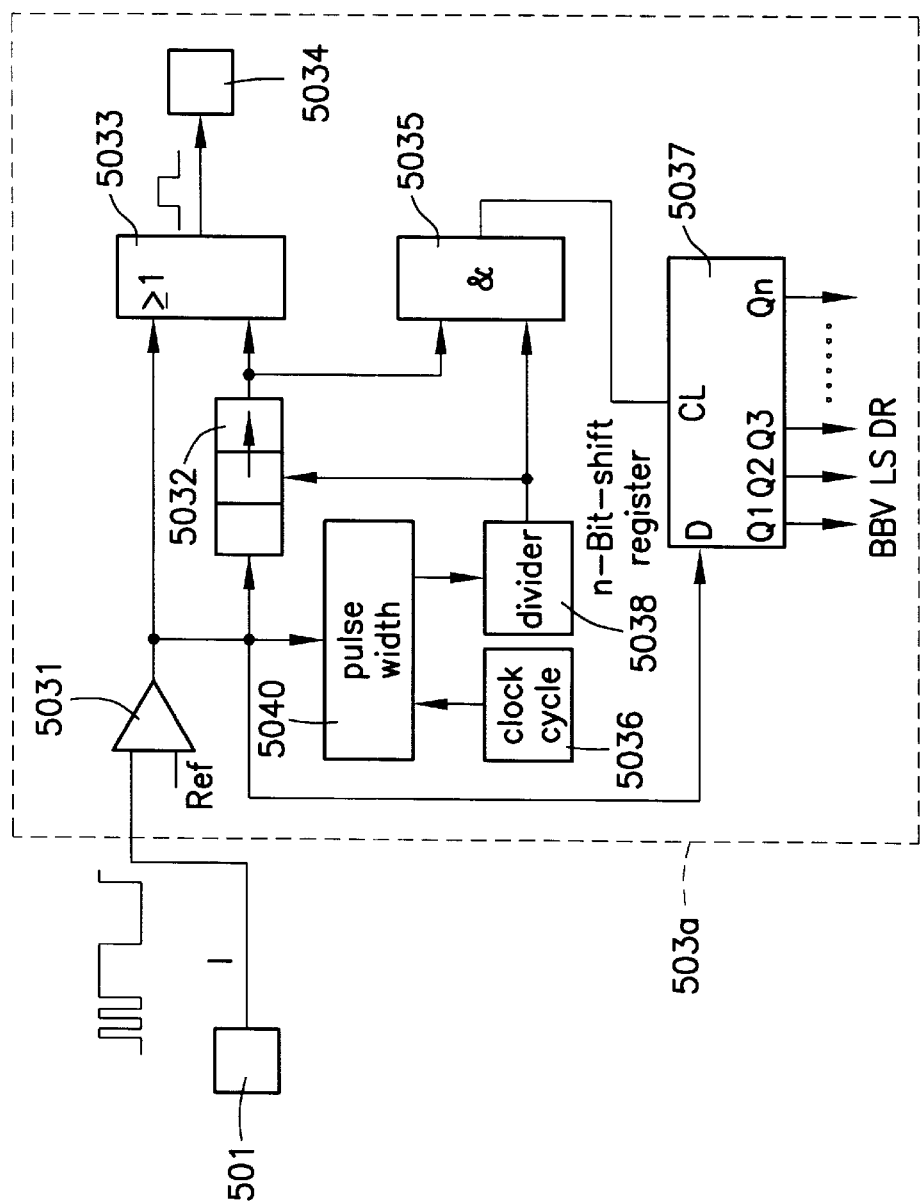
FIG. 11 shows a detailed diagram of another analysis unit, according to the present invention.

Superimposed signal I shown in the bottom part of FIG. 9 is sent to analysis unit 503a shown in FIG. 11. Signal analysis is first presented with reference to superimposed signal I shown in FIG. 10.

In a signal analyzer corresponding to a standard computer interface, each bit is interrogated (or sampled) three times, i.e. the state (high or low) of the bit is sampled three times within the temporal bit width. A 2-of-3 selection is then made to determine the bit state. Thus, a bit state is detected as, for example, high if at least two of the three samples results in a high state. The result (in the case of the present approximation) is a sampled repeat time of approx. 1.25 μsec. In other words, the applied signal is read in every 1.25 μsec. This sampled repeat time must be subjected to the tolerance of clock-pulse generator 5012a of the sensor unit (the sensor clock), i.e. must be adjustable within the aforementioned range of +/−20%.

The triple sampling rate results in (3+1)*10 sampling points=40 samples over the width of the word. In order for all the sampling points to hit the bits correctly over the entire word width (40–60 μsec), a time synchronization of 2.5% between the sensor unit and analysis unit is necessary. This is explained by the fact that the last sampling point must deviate from the reference value by no more than the sampling interval. Thus:

Sampling interval–100%*word width/40 samples=2.5%

When superimposed signal I (shown in FIG. 9) formed in sensor unit 501a is sent to analysis unit 503a (see FIG. 11), sensing of the oscillator frequency (oscillator 5012a) of sensor unit 501a thus occurs by measuring the pulse width of the first transmitted pulse (pulse width measurement 5040). The first pulse has a length of four sensor clock lengths (4 *$T_{sensorclock}$). This pulse width must be detected to an accuracy of 2.5%. The result is that the minimum required digital step width of the analysis timer must be 2.5% of (4*$T_{sensorclock}$):

Digital step width=0.025*4*4 μsec=400 nsec

This corresponds to a 2.5 MHZ oscillator. Taking into account a digitizing effect during pulse width measurement, an oscillator frequency of 5–10 MHZ is then required.

Assuming a maximum rotational speed frequency of 2 kHz, and if only 4 data bits need to be transferred, the result is that the analysis oscillator frequency can be slower by a factor of 2.5.

Division of the analysis clock cycle (divider 5038), under the control of the pulse width measurement section 5040, thus yields the desired synchronization and therefore produces reliable separation of the superimposed data in signal I.

Figure 12:
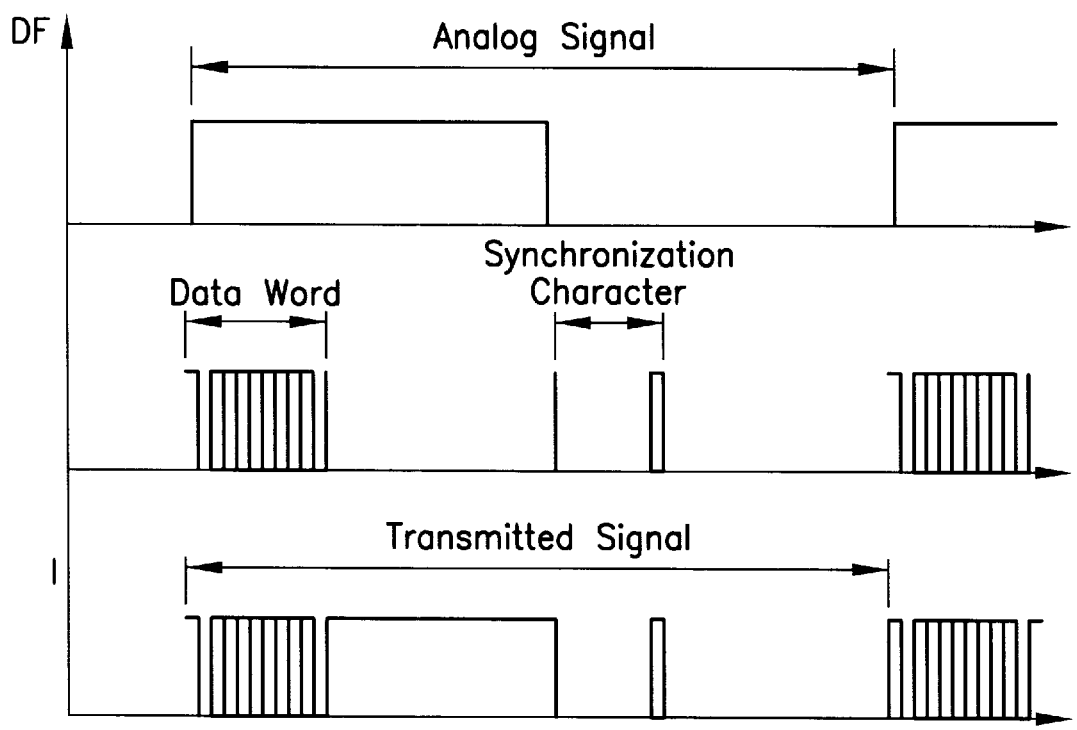
FIG. 12 shows a graph the rotational speed signal generated by the analysis unit illustrated in FIG. 11.

While in the second embodiment both the total data word and the synchronizing pulse were transmitted during one state (in this case the high state) of the DF signal, provision can also be made for the synchronizing signal to be transmitted during the one phase of the DF signal (in the low phase shown in FIG. 12), and the total data word in the other phase. This has the advantage that the digital signal can be longer and/or the bit width can be longer. In addition, the synchronizing signal can be longer, which leads to more accurate synchronization.

Assuming that a word width of 100 μsec is possible, the resulting bit width should be 10 μsec (for 1 start bit, 1 stop bit, and 8 data bits). The accuracy required for frequency measurement is still 2.5%, but the measurement of the synchronizing pulse time can be 80 μsec long.

Digital step width=0.025*8*10 μsec=2 μsec

This corresponds to a 500 kHz oscillator. The requirement in terms of the oscillator can thus be reduced.

What is claimed is:

1. A system for superimposing data, comprising:
   a sensor generating an analog signal, the analog signal having two levels, a frequency of periodic fluctuation between the two levels of the analog signal representing data sensed by the sensor;
   a controller generating a digital signal, the digital signal including a digital data words and
   means for superimposing the digital signal on the analog signal to provide a superimposed signal.

2. The system according to claim 1, further comprising a clock pulse generator for producing a clock cycle, wherein the digital data word includes a plurality of bits, each bit having two bit levels, each of the bits having a preset temporal length, and wherein the two levels of the analog signal correspond to one of a first set of two different current levels of the analog signal and a second set of two different voltage levels of the analog signal, the temporal length of the plurality of bits being determined by the clock cycle.

3. The system according to claim 2, wherein the digital data word includes at least one start/stop permanently preset bit with a permanently preset level, the at least one start/stop permanently preset bit being located at one of a front end of the digital data word and a back end of the digital data word, wherein, when located at the front end of the digital data word, the at least one start/stop permanently preset bit is a start bit and, when located at the back end of the digital data word, the at least one start/stop permanently preset bit is a stop bit.

4. The system according to claim 3, further comprising at least one synchronizing permanently preset bit with a permanently preset level, the at least one synchronizing permanently preset bit being located at one of a location prior to the front end of the digital data word and a location after the back end of the digital data word.

5. The system according to claim 1, further comprising a shift register receiving digital data and outputting the digital data serially in synchrony with the analog signal to generate the digital data word.

6. The system according to claim 1, wherein the analog signal corresponds to one of a rotational speed of a vehicle wheel, a gasoline motor of a vehicle, a diesel motor of a vehicle, an electric motor of a vehicle, and a shaft coupled to a vehicle transmission.

7. The system according to claim 6, wherein the digital data word includes at least one of brake lining wear data for at least one vehicle wheel brake, rotation direction data, and sensor status data.

8. A system for superimposing data, comprising:
- a sensor generating an analog signal, the analog signal having two levels, a frequency of periodic fluctuation between the two levels of the analog signal representing data sensed by the sensor;
- a controller generating a digital signal, the digital signal including a digital data word; and
- means for superimposing the digital signal on the analog signal to provide a superimposed signal;
- wherein the two levels of the analog signal correspond to one of a first set of two different current values of the analog signal and a second set of two different voltage values of the analog signal, and wherein the digital signal is superimposed only on a portion of the analog signal of which the level is a first one of the two levels.

9. A system for superimposing data, comprising:
- a sensor generating an analog signal, the analog signal having two levels, a frequency of periodic fluctuation between the two levels of the analog signal representing data sensed by the sensor;
- a controller generating a digital signal, the digital signal including a digital data word, wherein the digital word includes:
  - a plurality of bits, each bit having two bit levels, each of the bits having a preset temporal length; and
  - at least one start/stop preset bit with a permanently preset level, the at least one start/stop permanently preset bit being located at one of a front end of the digital data word and a back end of the digital data word, and, when located at the front end of the digital data word, the at least one start/stop permanently preset bit is a start bit, and, when located at the back end of the digital data word, the at least one start/stop permanently preset bit is a stop bit;
- means for superimposing the digital signal on the analog signal to provide a superimposed signal; and
- a clock pulse generator for producing a clock cycle;
- wherein:
  - the two levels of the analog signal correspond to one of a first set of two different current levels of the analog signal and a second set of two different voltage levels of the analog signal, the temporal length of the plurality of bits being determined by the clock cycle; and
  - the digital data word is superimposed on a portion of the analog signal, the level of which is a first one of the two levels of the analog signal, and wherein the level of the at least one start/stop bit is preset at a second one of the two levels of the analog signal.

10. The system according to claim 9, further comprising an analysis unit receiving the superimposed signal, wherein the clock-pulse generator samples the plurality of bits and presets the clock cycle as a function of the synchronizing and start/stop permanently preset bits.

* * * * *

UNITED STATES PATENT AND TRADEMARK OFFICE
CERTIFICATE OF CORRECTION

PATENT NO. : 6,109,102
DATED : August 29, 2000
INVENTOR(S) : Thomas Schneider

Page 1 of 1

It is certified that error appears in the above-identified patent and that said Letters Patent is hereby corrected as shown below:

<u>Column 5,</u>
Line 42, change "... 102 ..." to -- 1021 --.

<u>Column 10,</u>
Line 31, change "... words and ..." to -- word; and --.

Signed and Sealed this

Sixteenth Day of October, 2001

*Attest:*

*Attesting Officer*

NICHOLAS P. GODICI
*Acting Director of the United States Patent and Trademark Office*